United States Patent [19]

Showalter et al.

[11] Patent Number: 5,333,841

[45] Date of Patent: Aug. 2, 1994

[54] NOZZLE INSERT FOR USE IN METAL SCARFING APPARATUS

[75] Inventors: Michael S. Showalter; John G. Dawson, Jr., both of Florence; Frank J. Gusky, Quinby, all of S.C.

[73] Assignee: The ESAB Group, Inc., Florence, S.C.

[21] Appl. No.: 988,450

[22] Filed: Dec. 10, 1992

Related U.S. Application Data

[63] Continuation-in-part of Ser. No. 805,111, Dec. 9, 1991, Pat. No. 5,234,658, and a continuation-in-part of Ser. No. 948,027, Sep. 21, 1992.

[51] Int. Cl.$^5$ .............................................. B23K 7/06
[52] U.S. Cl. ........................................ 266/51; 239/552
[58] Field of Search .................... 266/48, 51; 239/552

[56] References Cited

U.S. PATENT DOCUMENTS

| | | | |
|---|---|---|---|
| 2,468,824 | 5/1949 | Hughey | 239/552 |
| 2,496,923 | 2/1950 | Walters et al. | 239/552 |
| 2,521,199 | 9/1950 | Babcock | 148/9 R |
| 2,531,006 | 11/1950 | Smith | 239/552 |
| 2,838,431 | 6/1958 | Allmang et al. | 266/51 |
| 3,230,116 | 1/1966 | Wandelt | 148/9 R |
| 3,231,431 | 1/1966 | Allmang | 266/51 |
| 3,477,646 | 11/1969 | Lytle | 266/51 |
| 3,647,570 | 3/1972 | Lytle | 266/51 |
| 4,038,108 | 7/1977 | Engel et al. | 266/51 |
| 4,115,154 | 9/1978 | Fuhrhop | 148/9.5 |
| 4,173,499 | 11/1979 | Hölemann | 148/9 R |
| 4,455,176 | 6/1984 | Fuhrhop | 148/9 R |
| 4,501,624 | 2/1985 | Lotz | 148/9 R |
| 4,765,597 | 8/1988 | Fuhrhop et al. | 266/51 |
| 4,954,683 | 9/1990 | Hatch | 219/121.5 |

FOREIGN PATENT DOCUMENTS 274377 11/1990 Japan.

Primary Examiner—Scott Kastler
Attorney, Agent, or Firm—Bell, Seltzer, Park & Gibson

[57] ABSTRACT

A thermochemical scarfing apparatus is disclosed which allows a greater diagonal standoff distance from the metal workpiece during preheating. The operating steps of the apparatus includes preheating the end of the metal workpiece, and then scarfing the workpiece by directing a scarfing oxygen stream onto the workpiece at an acute angle and while moving the workpiece past the oxygen outlet port. The preheating step includes generating a high speed stream of oxidizing gas and a concentric stream of fuel gas coaxially about the central stream, so that the momentum of the central stream is maintained. As a result, the effective flame heating distance may be extended, and the manifold and head assembly which supports the preheating gas nozzles may be moved back from the workpiece a significant standoff distance so as to avoid damage from dislodged molten metal slag.

7 Claims, 9 Drawing Sheets

NOZZLE INSERT FOR USE IN METAL SCARFING APPARATUS

CROSS REFERENCE TO RELATED APPLICATIONS

This is a continuation in part of copending applications Ser. No. 07/805,111, now U.S. Pat. No. 5,234,658 and Ser. No. 07/948,027. The disclosures of these copending applications are expressly incorporated herein by reference.

FIELD OF THE INVENTION

This invention relates to an apparatus for thermochemically scarfing a metal workpiece, and more particularly, to a nozzle insert for use in a scarfing apparatus of the described type and which allows a significant diagonal stand-off distance from the end of the workpiece during preheating and scarfing initiation so that molten metal is not blown onto the scarfing apparatus.

BACKGROUND OF THE INVENTION

Steel slabs commonly are conditioned by moving scarfing units along the top, bottom and side surfaces of a steel slab to eliminate surface defects such as cracks, seams and slag intrusions. One conventional scarfing apparatus includes top, side and bottom scarfing units that are mounted across the width and end portions of a support. The top, side and bottom units are arranged to scarf all sides of the slab.

Both top, side, and bottom units include a manifold and head assembly, which receives and distributes oxygen and fuel gas to upper and lower preheat blocks. The upper and lower preheat blocks are spaced from each other to define between the two blocks an oxygen scarfing slot through which a quantity of oxygen is blown onto the slab surface to enable scarfing. The lower preheat block includes a fuel gas channel having a discharge end positioned adjacent the oxygen slot for discharging a fuel gas adjacent the oxygen flow.

As illustrated for example in U.S. Pat. No. 4,115,154, the upper preheat block typically is a one-piece unit that includes oxygen and fuel gas channels each having discharge orifices to define nozzles through which a combination of oxygen and fuel gas is discharged for preheating the slab before scarfing. Later, a postmix flow of oxygen and fuel gas provides for scarfing. To maintain a proper vertical stand-off distance of the nozzle exit from the steel slab, the top and bottom scarfing units include riding shoes positioned on respective lower preheat blocks. Because the integrally formed nozzles do not provide for a high speed gas flow outward from the scarfing units, the total diagonal stand-off distance, i.e., the vertical stand-off distance and horizontal stand-off distance (the lead distance from the scarfing unit to the slab) is small, and the scarfing units must be placed in close proximity to the slab during preheating. Thus, in a conventional scarfing unit as illustrated in the above referenced patent, the upper preheat block extends forward and hangs over the lower preheat block to direct the preheating stream of gas discharged from the upper preheat block onto the slab during preheating.

Because the upper preheat block extends forwardly beyond the lower preheat block during initial preheating of the slab, the molten steel formed on the slab edge may drip onto portions of the upper preheat block positioned below the slab. The molten steel may damage the upper preheat block requiring reconstruction or replacement of the preheat blocks. To avoid this problem, during initial preheating, the scarfing units are positioned adjacent the slab and heat the slab one to two inches inward of the end to prevent steel and slag from dripping onto the forwardly extending preheat block. As a result of starting the scarfing process inward from the end of the steel slab, the one or two inches of unscarfed steel must be either scrapped or hand scarfed, leading to excessive production costs.

Additionally, through continued use, the discharge ends forming the upper preheat nozzles may wear. Because the preheat nozzles are integrally formed in the upper preheat block, any damage to the nozzle area mandates either replacement of the entire upper preheat block, or removal of the damaged area and the brazing of new material onto the upper preheat block.

SUMMARY OF THE INVENTION

It is accordingly an object of the present invention to provide a scarfing apparatus that allows a greater diagonal standoff distance from the metal workpiece during preheating and initial scarfing, and so that significant quantities of molten metal are not blown onto the scarfing apparatus.

It is a more particular object of the present invention to provide a scarfing apparatus which includes a number of nozzles for directing a high speed preheating gas stream toward the workpiece, with the gas stream comprising separate streams of oxidizing gas and fuel gas which are adapted to be ignited at a substantial distance from the scarfing apparatus, and so that particles of molten metal are not blown onto the apparatus in significant quantities.

The above and other objects and advantages of the present invention are achieved in the embodiments illustrated herein by the provision of a novel nozzle construction which comprises an insert which is mounted in a cylindrical opening in a supporting member of the scarfing apparatus. The insert includes a generally cylindrical body member defining a longitudinal axis and a forward discharge end and a rear end, and a central bore extending through the body member along the longitudinal axis. A plurality of longitudinally extending substantially parallel flutes are spaced about the exterior surface of the body member and along a portion of the length thereof adjacent the forward discharge end. As the result of this construction, when the insert is mounted in the cylindrical opening of the supporting member, a high speed gas flow may be directed through the central bore and a substantially concentric stream may be directed through the channels which are formed between the flutes and the cylindrical opening.

In the preferred embodiment, the insert further includes a resilient O-ring positioned circumferentially thereabout at a location spaced from the flutes and so as to be adapted to form a seal with a mating portion of the cylindrical opening of the supporting member. Also, the central bore of the insert includes a first converging portion and a second diverging portion which terminates at the discharge end thereof.

The scarfing apparatus having the nozzles of the present invention is operated in accordance with a process which includes the step of preheating an area on the surface of a stationary workpiece. This preheating step includes directing a preheating gas stream through the nozzles and toward the area, and the preheating gas stream comprises a high speed central stream of oxidizing gas which is directed through the bore of the insert, and a concentric stream of fuel gas which flows through the channels formed between the flutes and the opening in the supporting member, and thus coaxially about the central stream so as to be essentially parallel to the flow of the central stream. As a result, the momentum of the central stream is substantially maintained. Thereafter a stream of scarfing oxidizing gas is directed at an acute angle toward the preheated area of the workpiece, and relative movement is initiated between the workpiece and the stream of scarfing oxidizing gas so as to produce a scarfing cut.

In one preferred method of operating the apparatus, the preheating gas stream is stabilized, by directing a first stabilizing stream of oxidizing gas immediately above the preheating gas stream, and directing a second stabilizing stream of oxidizing gas immediately below the preheating stream. Preferably, the second stabilizing stream is discharged from the same port which later discharges the scarfing oxidizing gas.

The scarfing apparatus comprises a manifold and head assembly which includes upper and lower preheat blocks, with the blocks being spaced from each other to define an oxygen scarfing slot therebetween. A plurality of discharge nozzles are mounted adjacent to each other in a row above and parallel to the slot, with each nozzle including a nozzle insert as described above and which is mounted in an opening in the supporting block of the apparatus.

The scarfing method includes the steps of positioning the manifold and head assembly at a diagonal standoff distance from an end of an elongate metal workpiece, preheating the end of the metal workpiece and including generating a high speed stream of oxidizing gas through the central bore of the nozzles and while generating a stream of fuel gas through the outer channels of the nozzles. The streams are ignited and directed toward the end of the metal workpiece, and then the streams of the oxidizing gas and fuel gas from the nozzles are reduced to a low flow rate. Scarfing of the workpiece then commences, which includes generating a high speed stream of scarfing oxidizing gas from the slot, and while moving the workpiece horizontally toward and then past the manifold and head assembly so as to produce a scarfing cut.

In the preferred embodiment, the central bore of the nozzle insert includes a first converging portion and a second diverging portion terminating in an oxygen discharge end of the nozzle insert. The diameter of the diverging portion at the oxygen discharge end is less than the diameter of the bore before converging. This construction provides for a high speed, and preferably supersonic, oxygen flow from the central bore.

Also in the preferred embodiment, the lower preheat block includes a fuel gas flow channel and discharge end positioned adjacent the oxygen slot defined between the upper and lower preheat blocks. The upper preheat block includes a slot positioned above the row of nozzles. The slot extends through the upper preheat block for receiving a flow of oxygen from the manifold and head assembly and forming a shielding oxygen flow for the gas exiting the discharge end of the nozzles.

In the scarfing method of the present invention, the diagonal standoff distance is between about six to ten inches during preheating of the slab. The horizontal standoff distance from the steel slab is between about three to five inches during preheating of the slab, and the vertical standoff distance from the steel slab is between about one and one half and three inches.

The step of moving the workpiece includes accelerating the workpiece over a predetermined time period in order to reach a final scarfing speed, and in accordance with the preferred embodiment of the invention, the manifold and head assembly is closed so as to move into contact with the moving workpiece during the time the workpiece is accelerating. Also, it is preferred to accelerate the workpiece in two stages, with the closing of the manifold and head assembly occurring during the second stage.

BRIEF DESCRIPTION OF THE DRAWINGS

Some of the objects and advantages of the present invention having been set forth above, other objects and advantages will appear as the description proceeds, when taken in conjunction with the accompanying drawings, in which.

DETAILED DESCRIPTION OF THE PREFERRED EMBODIMENT

Figure 1:
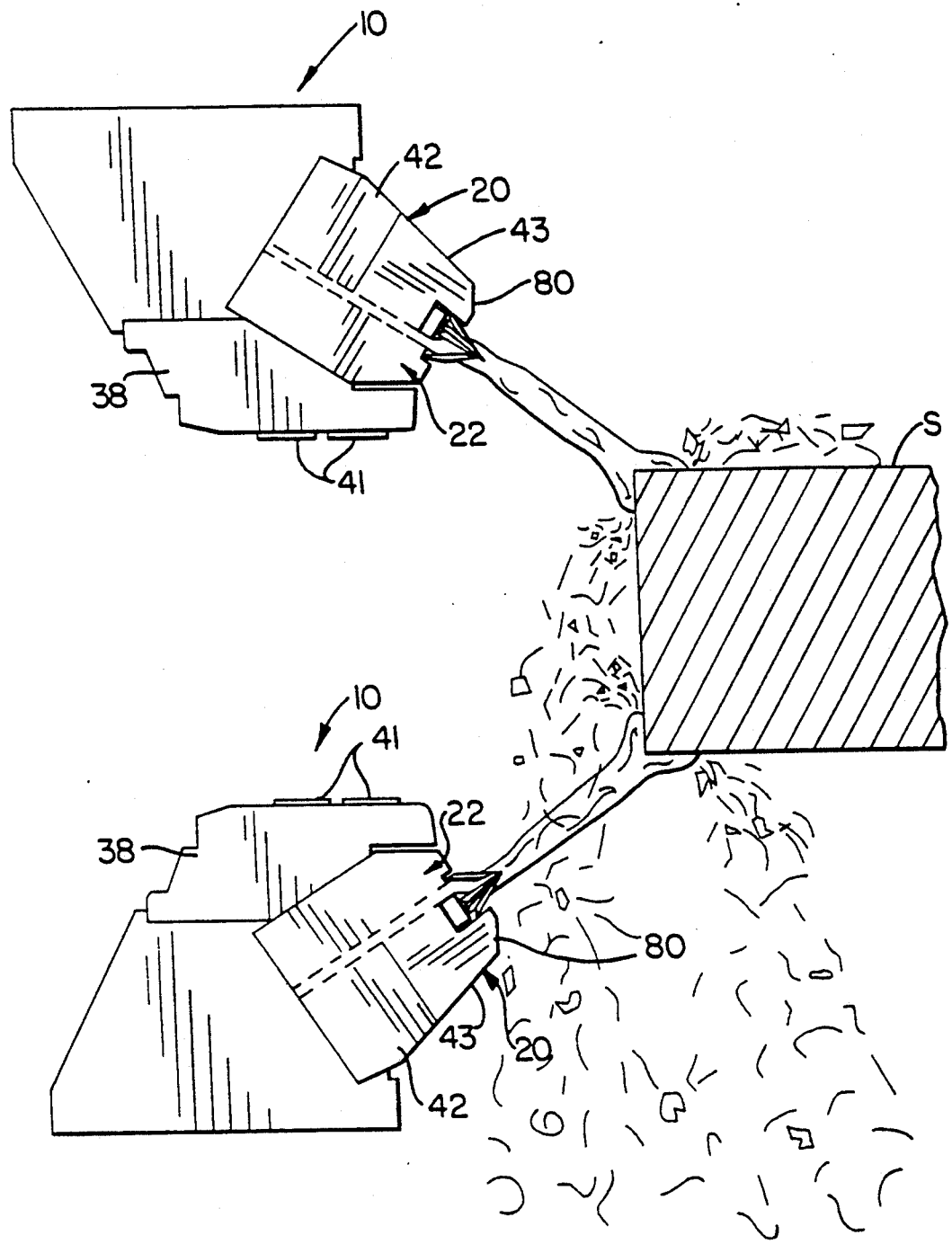
FIG. 1 is a schematic side elevation view of upper and lower scarfing apparatus positioned for preheating and scarfing of a steel slab.

Referring now to the drawings, and more particularly to FIG. 1, there is illustrated the scarfing apparatus 10 in accordance with the present invention. Two scarfing apparatus 10 are illustrated in two positions, one above and one below the plane of a steel slab to be scarfed. The scarfing apparatus 10 are usually mounted across the width of supports 11 (FIG. 11) and arranged to scarf the top and bottom of a slab S. Additionally, side scarfing units 10a are positioned on supports 11 to aid in scarfing the sides of a slab S (FIG. 11), which normally is positioned on a movable table (not shown) that can extend through the rectangular housing configuration defined by the scarfing apparatus.

In accordance with the present invention, the scarfing apparatus 10 is constructed to allow a stand-off distance from a slab during preheating and scarfing so that preheating and scarfing can occur on the end corner of the slab without having slag or other hot, molten metal fall onto the apparatus, as occurs in other, conventional scarfing units during initial starting adjacent the slab edge.

Figure 2:
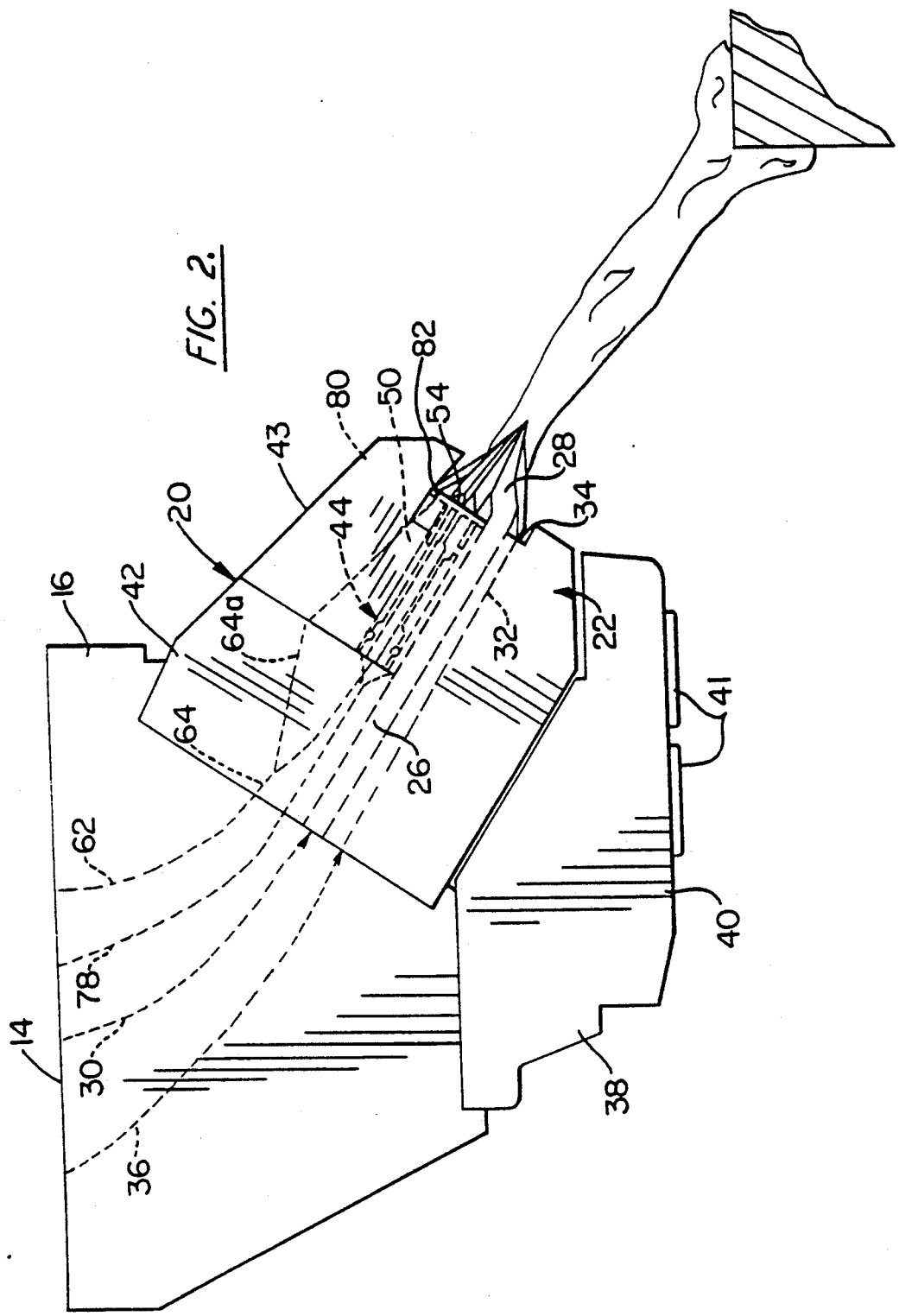
FIG. 2 is an enlarged, schematic side elevation view of the upper scarfing apparatus of FIG. 1.

As shown in greater detail in the schematic illustration of FIG. 2, the apparatus includes a manifold and head assembly 14, typically formed from a bronze or copper material, and having fuel and oxygen gas channels (shown schematically) which receive and distribute oxygen and fuel gas. The manifold and head assembly 14 includes a formed slot 16 along one edge in which upper and lower preheat blocks 20, 22 are mounted. Both the upper and lower preheat blocks 20, 22 extend outward from the manifold and head assembly 14 a substantially equal distance to each other. The upper and lower preheat blocks are preferably formed from copper.

Figure 6:
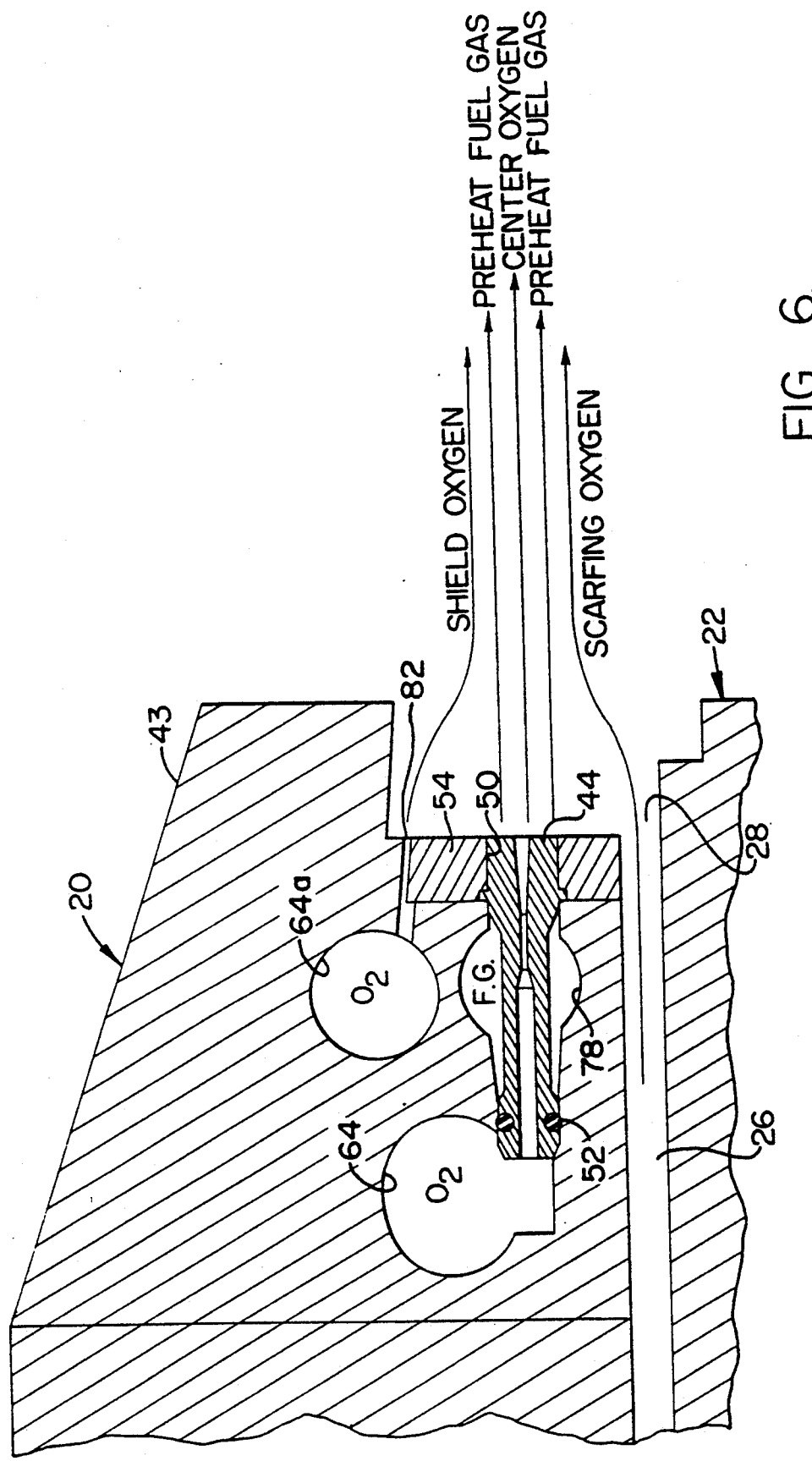
FIG. 6 is a fragmentary sectional view of the upper preheat block and illustrating the nozzle insert of FIGS. 4 and 5 and the preheating gas streams.
Figure 7:
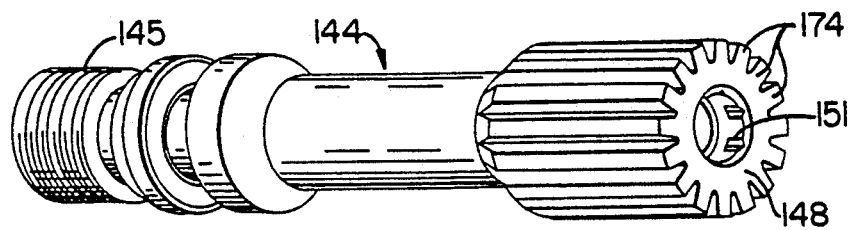
FIG. 7 is a perspective view of a second embodiment of the nozzle insert.
Figure 8:
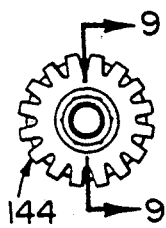
FIG. 8 is an end view of the nozzle insert shown in FIG. 7.
Figure 9:
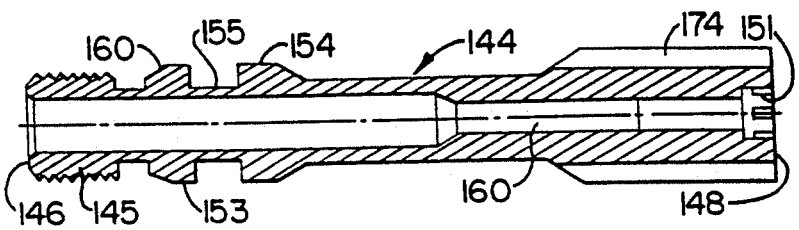
FIG. 9 is a sectional view of the insert taken substantially along the line 9—9 of FIG. 8.
Figure 10:
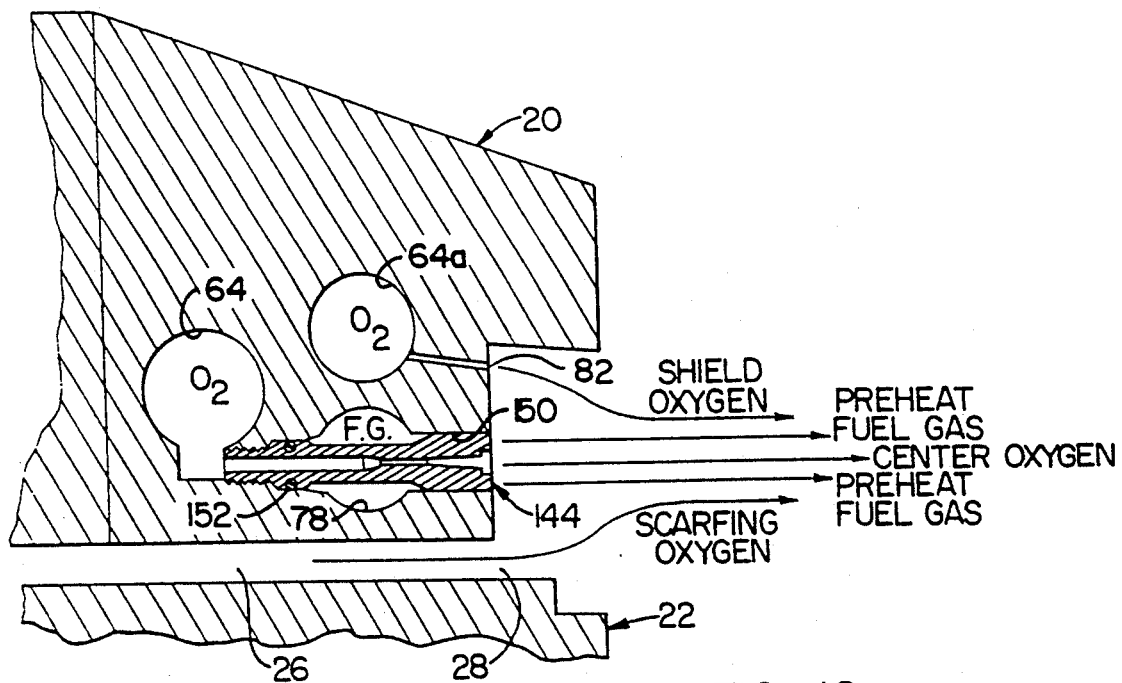
FIG. 10 is a view similar to FIG. 6, but illustrating the nozzle insert of FIGS. 7-9.

The upper and lower preheat blocks 20, 22 are spaced from each other to define an oxygen slot 26 and discharge orifice 28 of predetermined size for receiving a flow of scarfing oxygen from the manifold and head assembly and discharging the scarfing oxygen through the discharge orifice onto the steel slab S (FIGS. 2 and 6). An oxygen flow channel, illustrated schematically at 30, extends through the manifold and head assembly 14 and connects to the entrance end of the oxygen scarfing slot 26.

The lower preheat block 22 includes a fuel gas flow channel, indicated schematically at 32, and a discharge end 34 positioned adjacent to the scarfing slot 26. Fuel gas flows through a fuel gas flow channel 36 of the manifold and head assembly 14 into the fuel gas passageway 32 and exits as a scarfing flame during scarfing. A riding shoe 38 is positioned along the underside of the lower preheat block 22 and the manifold and head assembly 16. The riding shoe 38 includes a lower slab engaging surface 40 having slab engaging skids 41 adapted to contact the slab to position the scarfing discharge orifice 28 as well as the other exiting fuel and oxygen flows a predetermined distance from the steel slab. As shown in FIG. 1, the lower scarfing apparatus 10 is inverted and the riding shoe 38 is positioned to engage the bottom surface of the steel slabs S.

Figure 4:
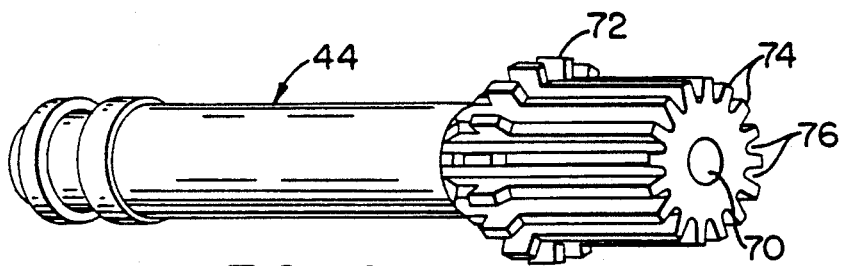
FIG. 4 is a perspective view of a nozzle insert in accordance with one embodiment of the present invention.
Figure 5:
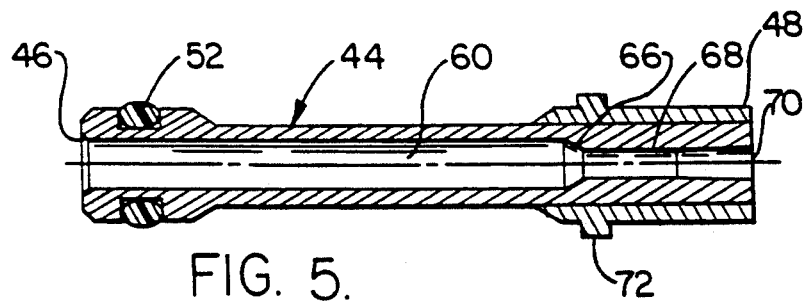
FIG. 5 is a sectional view of the nozzle insert shown in FIG. 4.

Each upper preheat block 20 includes a base member 42, and an extension member 43 secured to the base member 42 and extending forwardly therefrom. A plurality of preheat nozzle inserts 44 (FIGS. 3-6) are mounted adjacent to each other in a row across the width of the extension member 43. Each nozzle insert 44 is formed as a longitudinally extending, substantially cylindrically configured body member extending into the extension member 43 (FIG. 6). The nozzle inserts 44 preferably are each formed of a unitary piece of brass or copper with opposing gas entrance and discharge ends 46, 48 (FIG. 5). Each nozzle insert 44 is mounted within a mounting opening 50 in the extension member 43. An O-ring 52 is positioned on the outer circumference of the nozzle insert 44 at the entrance end and aids in centering and removably securing the nozzle insert 44 within the mounting opening 50 of the upper preheat block 20. Additionally, the O-ring serves as a seal to segregate oxygen and fuel gas, in the manner apparent from FIG. 6.

Figure 3:
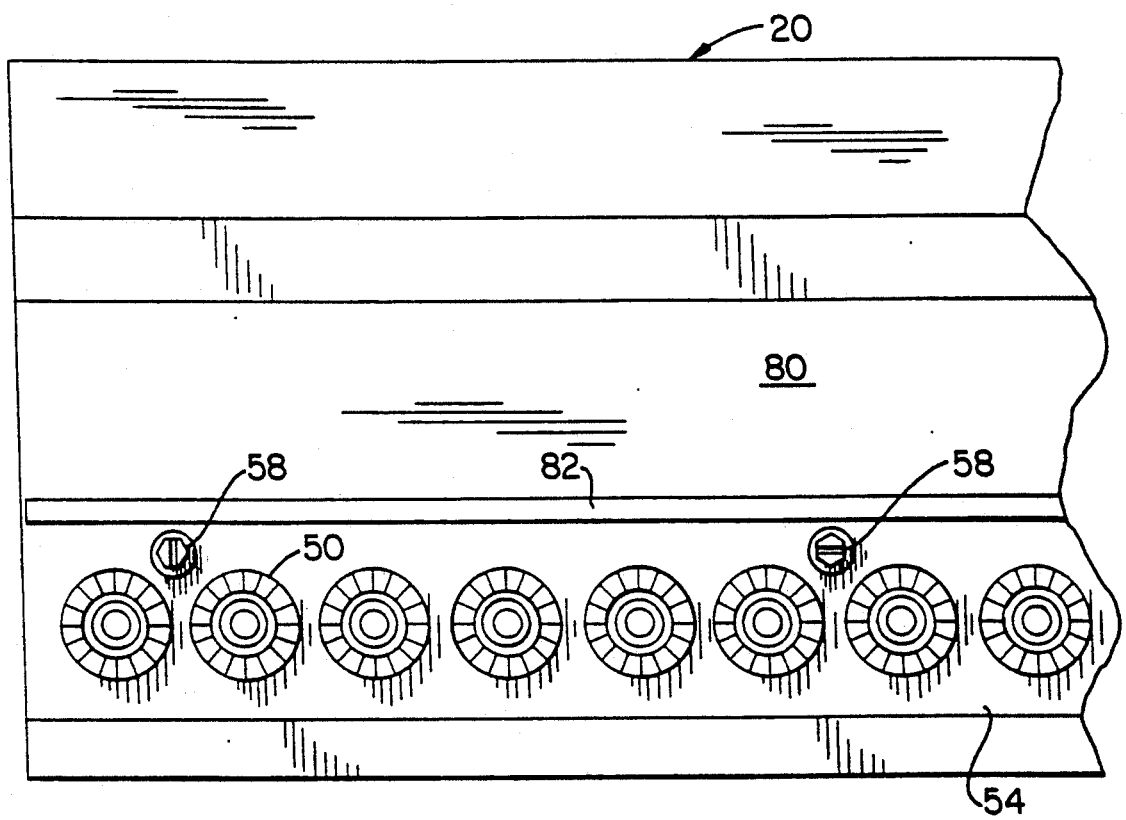
FIG. 3 is a front elevation view of the scarfing apparatus showing a plurality of nozzle inserts mounted in the upper preheat block.

A mounting plate 54 is secured to the upper preheat block and engages the discharge ends 48 of the nozzle inserts 44. The mounting plate 54 also aids in retaining the nozzle inserts 44 within the mounting openings 50. The mounting plate 54 includes holes which align and center the discharge ends 48 of the nozzle inserts 44. The mounting plate 54 is secured to the upper preheat block 20 by fasteners, such as machine bolts 58 (FIG. 3).

As illustrated in greater detail in FIG. 5, a central bore 60 extends axially through the nozzle insert 44. An oxygen flow channel 62 within the manifold and head assembly 14 passes gas into an upper preheat block fuel channel 64 and through the central bore 60 in communication with the channel 64 (FIG. 2). The central bore 60 includes a first converging portion 66, a throat portion 68, and a diverging end portion 70 (FIG. 5). The converging portio 66 tapers inward at a high angle as shown in FIG. 5. The second, diverging portion 70 tapers outward at a smaller angle. In the preferred embodiment the diameter of the diverging portion 70 at the oxygen discharge end is less than the diameter of the bore before converging. However, the bore before converging could be a smaller diameter than the exit diameter, or the bore could be designed straight completely through. Thus, oxygen gas received into the bore is constricted first within the converging portion where the gas velocity is increased. The oxygen then exits the discharge end as a high-velocity, preferably supersonic, accurately directed stream against the slab S.

A retaining ring 72 is formed on the discharge end 48 of the nozzle insert 44. As best seen in FIG. 4, the discharge end 48 includes elongate, concentric flutes 74 forming fuel gas flow channels 76 around the nozzle insert periphery through which fuel gas flows outward from the nozzle in substantially parallel, concentric flow around the central flow of oxygen. Fuel gas is delivered through an upper preheat block channel 78 (FIG. 6) and then onto the outer surface of the nozzle insert 44 and into the fuel gas channels 76 by the flutes. The concentric flow of fuel gas around the central flow of oxygen prevents a fuel gas flow intersection with the oxygen adjacent the nozzles. Thus, the momentum of the oxygen is maintained as it exits the nozzle insert 44. Mixing of oxygen and fuel gas occurs further downstream to produce a hotter flame at a more extended distance from the preheat blocks.

A forwardly protruding portion of the extension member 43 forms a shield plate S0 (FIGS. 2 and 3), which is positioned in spaced relation above the insert plate 54 to form a slot 82. An oxygen flow channel 64a extends off from the central oxygen flow channel 64 and through the upper preheat block to the slot 82. Oxygen discharged through the slot 82 forms a shielded oxygen flow for the oxygen and fuel gas flowing from the nozzle insert 44.

During operation, the apparatus 10 are positioned as shown in FIG. 1, including the side scarfing units (not shown), and the flows of oxygen and fuel gas through the various passageways are controlled to preheat the slab S. Because the nozzle insert 44 provides an efficient oxygen and fuel gas flow outward from the apparatus 10 without a sharp fuel gas flow intersection with the oxygen adjacent the nozzles, the momentum of the oxygen exiting the central bore is maintained until it intersects the fuel gas further downstream from the preheat blocks. As a result, a more enhanced and hotter flame is achieved, and the diagonal standoff distance is increased as compared to other conventional scarfing apparatus. With the present invention, a diagonal stand-off distance as high as fifteen inches has been achieved. As a result of this greater diagonal stand-off distance, during initial pre-heating of the slab S, the slag and molten steel cannot drop onto the apparatus and the scarfing operation can begin at the end portion of the slab. Additionally, during continued use of the apparatus, the discharge end of the nozzle insert may become worn. The nozzle insert 44 can be readily replaced by removing the mounting plate 54, and then removing the damaged nozzle insert 44. A new nozzle insert 44 is inserted within the mounting hole 50.

FIGS. 7-10 illustrate a second embodiment of the nozzle insert in accordance with the present invention at 144. In this embodiment, the insert 144 is composed of a unitary piece of metallic material, such as brass or copper, and it includes a converging-diverging bore 160 to facilitate the production of supersonic flow therethrough. The exterior surface includes a plurality of flutes 174 along about one quarter of the longitudinal length of the body member adjacent the forward discharge end 148, and the exterior surface also includes an externally threaded portion 145 adjacent the rear end 146. This threaded portion 145 is adapted to engage a mating threaded portion in the cylindrical opening 150 of the block, note FIG. 10, and to facilitate the engagement and disengagement of this threaded interconnection, the bore of the insert is provided with a hex socket 151 at the forward discharge end which is adapted to be engaged by an allen wrench or the like.

The insert 144 of FIGS. 7-10 also includes a pair of longitudinally spaced apart shoulders 154 positioned between the flutes 174 and the externally threaded portion 145, and so as to form an annular channel 155 therebetween which is adapted to receive a resilient O-ring 152. The rearward shoulder 153 also includes a rearwardly facing frusto-conical surface portion 160 which is adapted to form a metal to metal seat with a mating surface in the cylindrical opening 150 of the supporting block.

Figure 12:
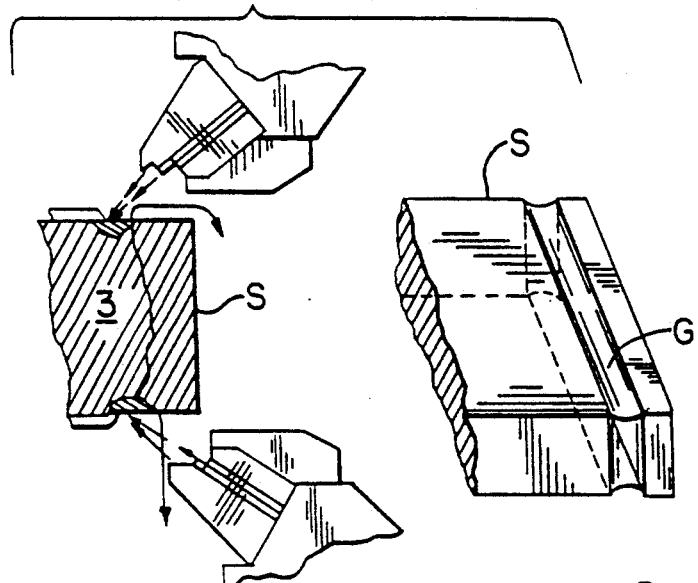
FIG. 12 is a schematic illustration of a prior art method of initiating end scarfing of a steel slab.

In FIG. 12, the prior art method of initiating near end scarfing one to two inches in from the end of a steel slab is illustrated and shown with a prior art apparatus having an overhanging preheat block. As shown, the scarfing apparatus begins its preheat one or two inches inward of the edge. In this preheat position, the apparatus has about a 0.5 inch vertical standoff above the slab, creating about a 1.25 inch diagonal standoff distance. As a result of starting the preheat inward from the slab end, a gullet G is formed across the width of the slab edge.

Figure 13:
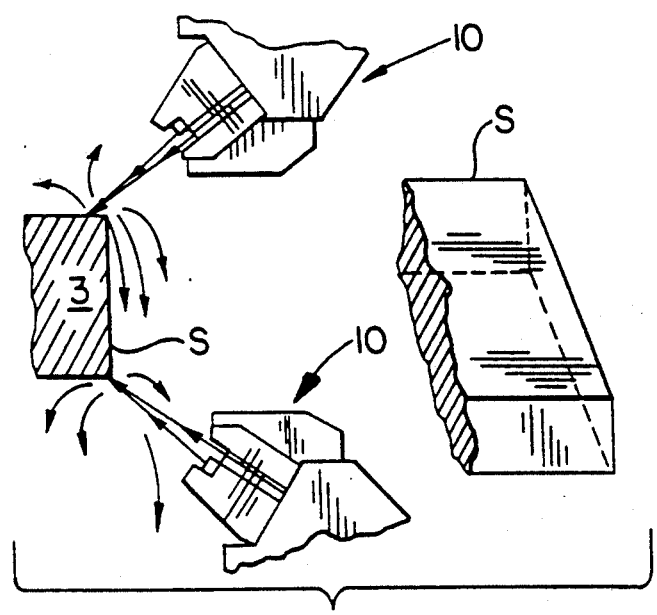
FIG. 13 is a schematic illustration of the method of initiating end scarfing of a steel slab in accordance with the present invention.

Looking now at FIG. 13, a preferred method of scarfing in accordance with the present invention is illustrated. During initial preheating, the scarfing apparatus is positioned as shown in FIG. 13. As compared to the prior art preheating method in which the diagonal standoff distance is only 1.25 inches (FIG. 12), the diagonal standoff distance of the present invention is greater, ranging from six to ten inches. The horizontal standoff distance is preferably between about three to five inches, as compared to the other prior art method in which there is no horizontal standoff separation and the prior art apparatus is positioned above the steel slab. The vertical standoff distance is preferably between about 1.5 to 2.0 inches as compared to the prior art method in which the vertical standoff preheating distance is only 0.5 inches.

As used herein, the diagonal standoff distance may be defined as the distance from the front of the nozzle inserts 44 or 144 to the front corner of the workpiece. Similarly, the horizontal standoff distance is the horizontal distance between a vertical plane containing the front of the nozzles and the end of the workpiece, and the vertical standoff distance is the vertical distance between a horizontal plane containing the skids 41 and the upper surface of the workpiece.

Figure 11:
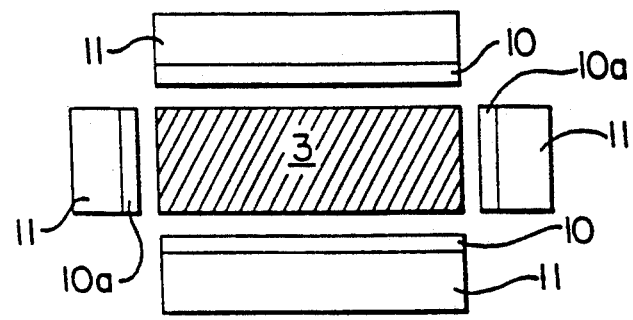
FIG. 11 is a schematic end view of scarfing apparatus positioned around a steel slab to be scarfed.

The steps involved in the initial starting of the scarfing process will now be described in more detail with reference to FIGS. 6 and 14. To initiate preheating, the table (not shown) on which the steel slab rests is moved into a position in which the scarfing apparatus 10 are positioned over and adjacent the slab. The scarfing units are closed as in conventional scarfing operations, and then the table is retracted into the preheat position (FIGS. 11 and 13). The scarfing apparatus preheat fuel gas is ignited at a low flow rate, and the preheat oxygen is also discharged at a low flow rate. Also, in the illustrated embodiment, a small volume flow of oxygen is concurrently directed through the scarfing slot 26 to provide a lower shield flow. The preheat fuel gas flow rate is then increased. Just after the preheat fuel gas flow rate is increased, the oxygen preheat flow is increased, and as best seen in FIG. 6, this flow includes a stabilizing stream emanating from the slot 82 and which is located immediately above the preheating gas stream emanating from the nozzles formed by the inserts 44 or 144. The oxygen flow rate is increased to about twice as much as normal oxygen preheat flow rates for the prior art methods and scarfing apparatus.

In one preferred embodiment, the central stream of oxygen is discharged at a substantially supersonic speed, and the concentric stream of fuel gas is discharged at a speed less than the speed of the central stream. Also, the upper and lower oxygen stabilizing streams are discharged at respective speeds which are less than the speed of the stream of fuel gas.

Figure 14:
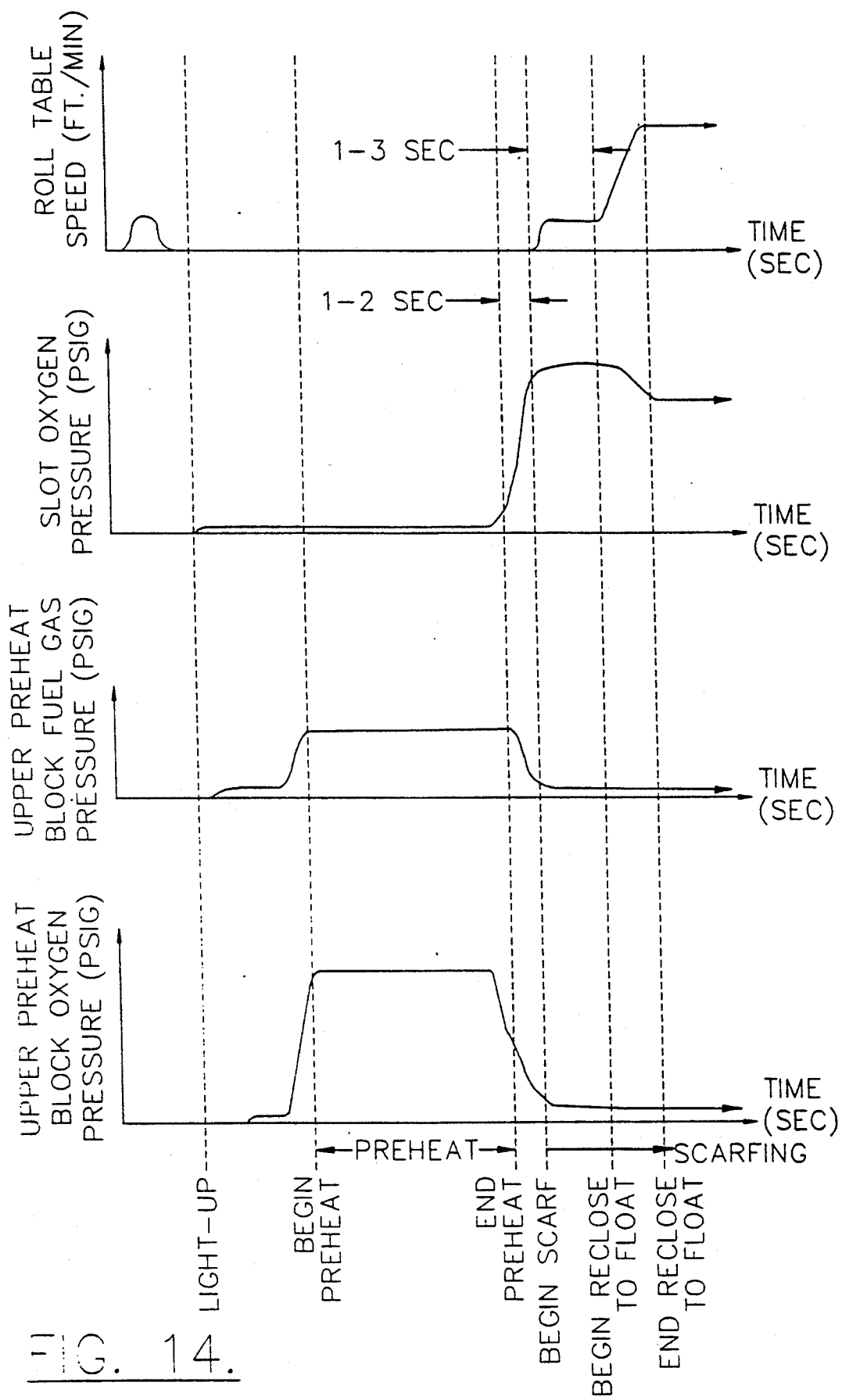
FIG. 14 is a graph of various steps involved in the preheating and initiation of end scarfing of a steel slab.

Once the steel slab is preheated, the preheat oxygen flow is substantially reduced as shown in FIG. 14, and the flow of scarfing oxygen is generated. When the scarfing oxygen has reached its peak pressure and flow rate, the preheating fuel gas is reduced, and the table holding the steel slab is moved toward the scarfing apparatus. In the preferred embodiment, the "dead time" in which the scarfing oxygen remains until table movement is about two seconds.

The table is initially moved forward at a first relatively slow speed, which is typically about 3 to 4 meters per minute, which is about one-fourth the normal speed of scarfing. After a predetermined period, its speed is increased to the normal scarfing speed, which is about four times as fast as the first speed. The flow rate of the oxygen is decreased slightly at the time when the table speed reaches the normal scarfing speed. Scarfing then continues as in normal prior art apparatus. Preferably, a stream of fuel gas is concurrently discharged from the discharge end 34 of the fuel gas channel 32 of the lower block, to facilitate maintenance of the oxidizing reaction. Also, as illustrated in FIG. 14, the manifold and head assembly closes so that it moves into contact and "floats" on the moving workpiece. The closing operation is commenced substantially concurrently with the acceleration of the workpiece from its initial speed to its operating or final scarfing speed. Also, the closing operation is timed to terminate substantially concurrently with the workpiece reaching its final scarfing speed.

Figure 15:
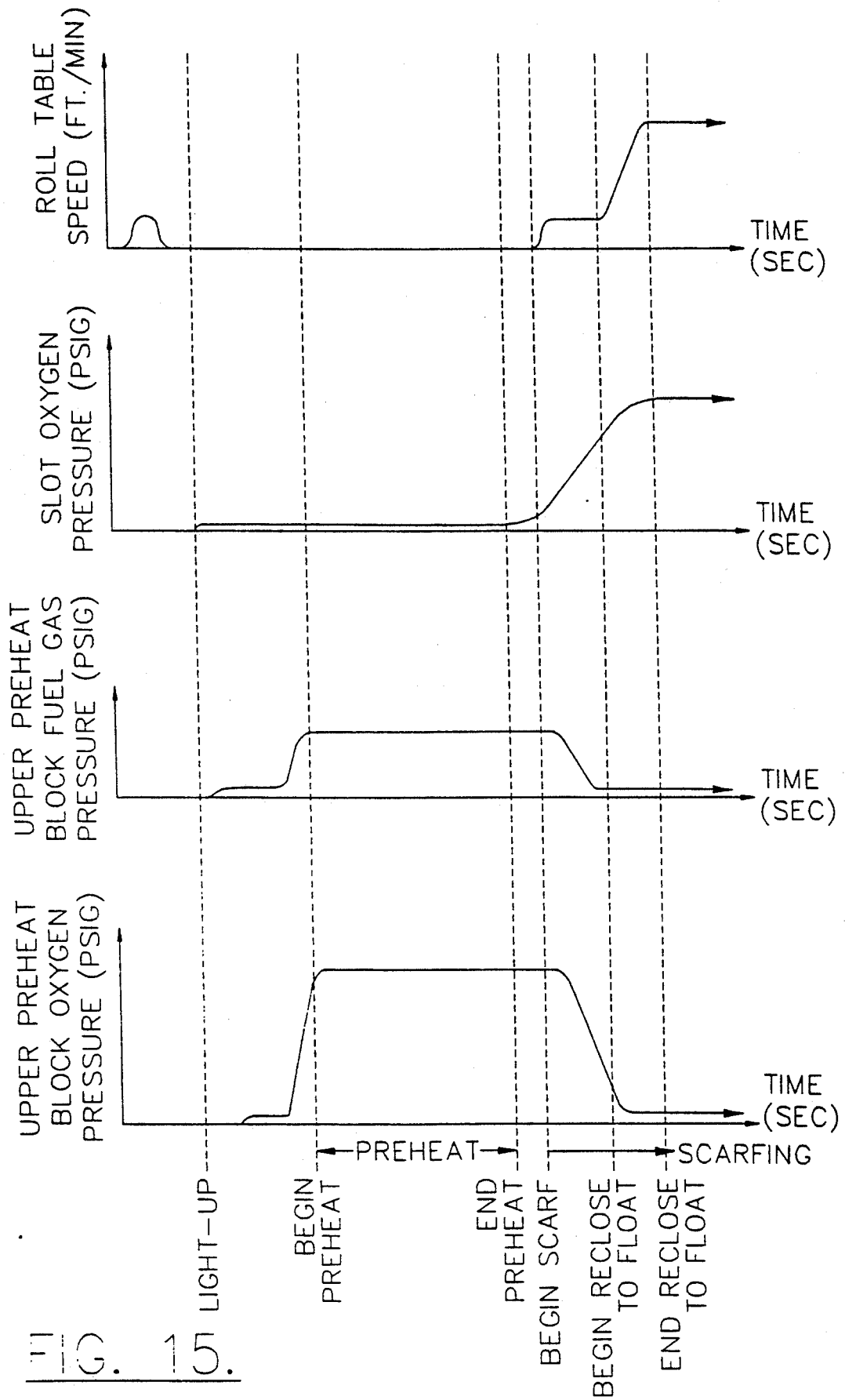
FIG. 15 is a graph similar to FIG. 14 but illustrating a modified procedure.

FIG. 15 illustrates a modification of the starting procedure. In this embodiment, the scarfing oxygen delivery does not commence as early as in the embodiment of FIG. 14, nor does it ramp up to a large rate and then back off as in FIG. 14. In FIG. 15, the scarfing, oxygen is smoothly increased during the acceleration of the table. The choice of these operating parameters is dependent in large measure to the initial standoff distance between the manifold and head assembly, and the workpiece.

Figure 16:
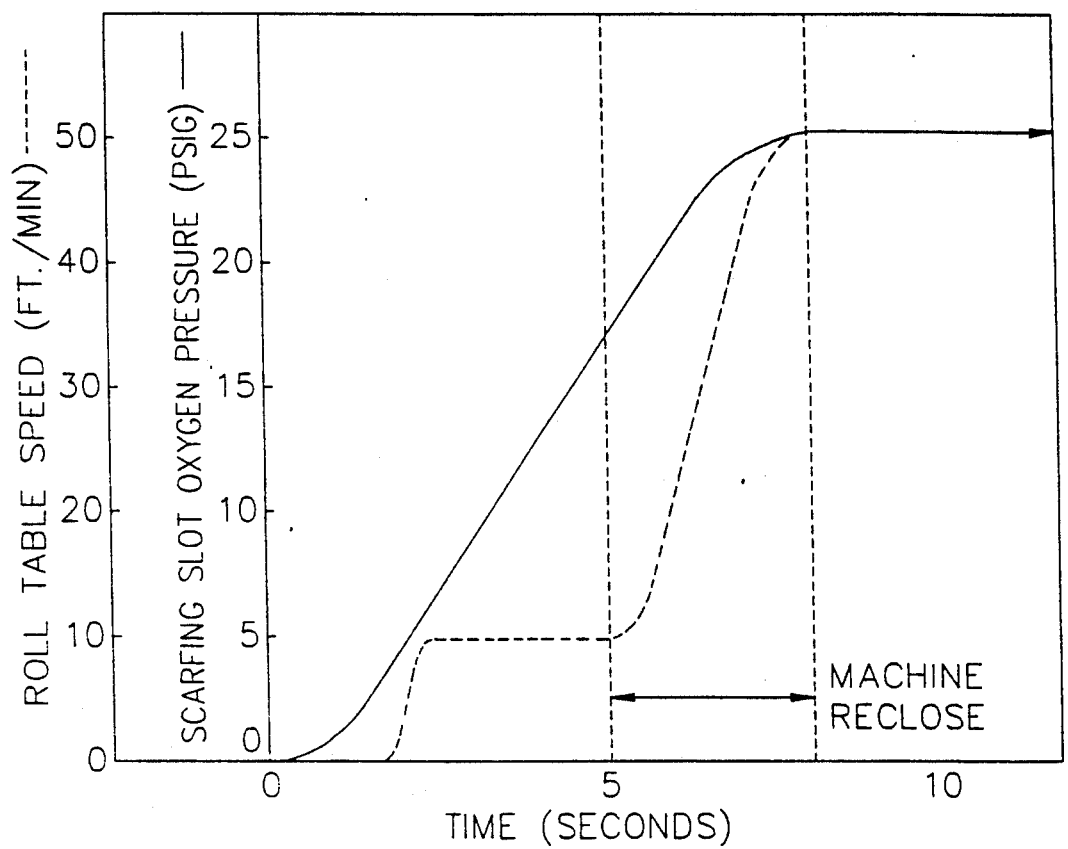
FIG. 16 is a graph illustrating the relationship roll table (i.e. workpiece) speed and scarfing oxygen pressure during scarfing initiation.

FIG. 16 illustrates the timing of the machine closing process and workpiece acceleration in the embodiment of FIG. 15, in somewhat more detail.

In the drawings and specification, there has been set forth a preferred embodiment of this invention, and even though specific terms are used, they are used in a generic and descriptive sense only and not for purposes of limitation.

That which is claimed is:

1. An insert adapted for forming a nozzle when mounted in a cylindrical opening in a supporting member and comprising a generally cylindrical body member composed of a unitary piece of metallic material and defining a longitudinal axis and a forward discharge end and a rear end, a central bore extending through said body member along said longitudinal axis, an externally threaded portion formed at said rear end of said body member so as to be adapted to engage a mating threaded portion in the cylindrical opening of the supporting member, and with said externally threaded portion defining an outside diameter, a plurality of longitudinally extending substantially parallel flutes formed at said forward discharge end of said body member and spaced about the exterior surface of said body member and along a portion of the length thereof adjacent said forward discharge end, said flutes having outer extremities which collectively define a cylinder which has a diameter greater than said outside diameter of said threaded portion and said body member including a pair of longitudinally spaced apart shoulders positioned between said flutes and said externally threaded portion and forming an annular channel therebetween which is adapted to received a resilient sealing O-ring, with one of said shoulders including a frusto-conical surface portion which faces toward said rear end and is adapted to form a metal to metal seat with a mating portion in the cylindrical opening of the supporting member, whereby the insert may be axially inserted into the cylindrical opening in the supporting member and then rotated to thread the externally threaded portion into the mating threaded portion in the cylindrical opening and so as to secure the insert in an operating position wherein a high speed gas flow may be directed through said central bore and a substantially concentric stream may be directed through the channels which are formed between said flutes and the cylindrical opening, and whereby the insert may be removed by rotation thereof in the opposite direction.

2. The insert as defined in claim 1 further including a resilient O-ring positioned circumferentially about said insert at said annular channel and so as to be adapted to form a seal with a mating portion of the cylindrical opening of the supporting member.

3. The insert as defined in claim 1 wherein said central bore includes a first converging portion and a second diverging portion which terminates at said discharge end thereof.

4. The insert as defined in claim 3 wherein the diameter of the diverging portion of said central bore at said discharge end is less than the diameter of said bore before converging.

5. The insert as defined in claim 1 wherein said flutes extend longitudinally along less than about one half of the longitudinal length of said body member and extend to said forward discharge end thereof.

6. The insert as defined in claim 1 wherein said body member further includes socket means formed at said forward discharge end which is adapted to be engaged by a turning tool.

7. The insert as defined in claim 1 wherein said channels which are formed between said flutes lie substantially parallel to said longitudinal axis.

* * * * *